United States Patent [19]

Nishikawa et al.

[11] Patent Number: 5,091,268

[45] Date of Patent: Feb. 25, 1992

[54] MAGNETIC RECORDING MEDIUM LUBRICATED BY A THREE COMPONENT FATTY ACID ESTER-FATTY ACID AMIDE COMPOSITION

[75] Inventors: Yasuo Nishikawa; Akira Kasuga; Tsutomu Okita; Masashi Aonuma, all of Kanagawa, Japan

[73] Assignee: Fuji Photo Film Co., Ltd., Kanagawa, Japan

[21] Appl. No.: 546,183

[22] Filed: Jun. 29, 1990

[30] Foreign Application Priority Data

Jun. 30, 1989 [JP] Japan .................... 1-168896

[51] Int. Cl.$^5$ .............................................. G11B 5/00
[52] U.S. Cl. ............................... 428/694; 428/695; 428/900; 252/62.54; 252/51; 252/56 R
[58] Field of Search ............ 428/694, 695, 900; 252/62.54, 51, 56 R

[56] References Cited

U.S. PATENT DOCUMENTS 4,652,500  3/1987  Ejiri et al. ................... 428/695
4,654,258  3/1987  Kawamata et al. ........... 428/323

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A novel magnetic recording medium is provided comprising a non-magnetic support having provided thereon a magnetic layer comprising a ferromagnetic powder dispersed in a binder, wherein at least one fatty acid amide compound represented by formula (I), at least one fatty acid ester represented by formula (II) and at least one fatty acid ester represented by formula (III) are provided in or on the magnetic layer:

$$R^1-\overset{O}{\underset{\|}{C}}-NH^2 \qquad (I)$$

wherein $R^1$ represents a $C_{13-21}$ straight-chain saturated hydrocarbon group;

$$R^2-\overset{O}{\underset{\|}{C}}-O-R^3 \qquad (II)$$

wherein $R^2$ represents a $C_{12-21}$ straight-chain or branched saturated or unsaturated hydrocarbon group; and $R^3$ represents a $C_{1-10}$ straight-chain or branched saturated or unsaturated hydrocarbon group;

$$R^4-\overset{O}{\underset{\|}{C}}-(O-R^5)_n-OR^6$$

wherein $R^4$ represents a $C_{12-21}$ straight-chain or branched saturated or unsaturated hydrocarbon group; $R^5$ represents a $C_{2-3}$ divalent hydrocarbon group; $R^6$ represents a $C_{1-10}$ straight-chain or branched saturated or unsaturated hydrocarbon group; and n represents an integer of from 1 to 10 where n may be the same or different when the magnetic layer contains two or more compounds represented by formula (III).

9 Claims, No Drawings

MAGNETIC RECORDING MEDIUM LUBRICATED BY A THREE COMPONENT FATTY ACID ESTER-FATTY ACID AMIDE COMPOSITION

FIELD OF THE INVENTION

The present invention relates to a magnetic recording medium, and more particularly to a magnetic recording medium having excellent electromagnetic properties and running durability.

BACKGROUND OF THE INVENTION

In recent years, the increasing demand for higher density recording has led to wide use of a ferromagnetic powder suitable for high density recording in the magnetic recording medium.

However, if a magnetic recording medium having a magnetic layer with a smooth surface is employed, an increase in the coefficient of friction thereof with the recordin apparatus results, to thereby tend to damage the magnetic layer, or the magnetic layer is peeled off the recording medium after a short use.

In particular, the magnetic layer of a video tape is subjected to severe conditions such as still mode operation in a video tape player. If a magnetic recording medium is repeatedly used under such conditions, the ferromagnetic powder tends to separate from the magnetic layer, to thereby clog the magnetic head.

In order to improve the running durability of a magnetic recording medium, it has been proposed to incorporate into the magnetic layer of the recording medium an abrasive (hard particles) such as corundum, silicon carbide and chromium oxide. However, if the abrasive is incorporated into the magnetic layer, the abrasive must be used in a relatively large amount to obtain the desired effect.

However, a magnetic layer comprising a large amount of an abrasive causes a remarkable abrasion of the magnetic head or the like. Furthermore, this approach runs counter to the teaching of the art that the magnetic layer is to be made as smooth as possible in order to improve the electromagnetic properties. Thus, the use of an abrasive is not a desirable approach to improve the running durability.

In another approach, it has been proposed to incorporate a fatty acid or an ester of a fatty acid with a fatty alcohol into the magnetic layer as a lubricant to reduce the coefficient of friction. In particular, a higher saturated fatty acid which greatly reduces friction has been widely used in video tape systems.

Various combinations of lubricants have heretofore been studied, including, for example, the fatty acid esters-fatty acid amide mixture systems disclosed in JP-B-47-15624 (the term "JP-B" as used herein means an "examined Japanese patent publication") and fatty acid ester mixture systems as disclosed in JP-B-51-39081. However, these lubricants stain the running path due to separation of the power from the magnetic layer, increase the running tension under conditions of high humidity, result in a deterioration in repetitive running performance and an increase in the drop out. In order to eliminate these disadvantages, it has been proposed to provide on the surface of the magnetic layer at least one $C_{12-22}$ saturated or unsaturated fatty acid, at least one saturated or unsaturated fatty acid ester containing a $C_{14-22}$ fatty acid residue, and at least one $C_{12-26}$ saturated or unsaturated fatty acid amides as disclosed in JP-B-59-3981. It was confirmed that this approach can remarkably eliminate the above described disadvantages.

However, particularly in more recent systems wherein a ferromagnetic powder is desired to be highly dispersed to obtain excellent electromagnetic properties, the use of saturated fatty acids reduces the dispersibility of the ferromagnetic powder or causes the agglomeration thereof, and thus cannot be incorporated into the magnetic layer in as large an amount as in the above-described techniques. Furthermore, the use of saturated fatty acids causes an increase in the coefficient of friction under conditions of high temperature and humidity. Thus, the above-described approach is also unsatisfactory.

Furthermore, it is known that in a system comprising a ferromagnetic metal powder, the addition of saturated fatty acids as a lubricant or as a magnetic layer component causes staining of the calendering roll used at the step of smoothening the magnetic recording medium, thereby resulting in poor productivity.

Moreover, JP-A-61-230624 (the term "JP-A" as used herein means an "unexamined published Japanese patent application") proposed a disc magnetic recording medium comprising a magnetic layer containing therein a fatty alkyl ester and a fatty alkoxy ester. It was found that this approach provides a remarkable improvement in the durability. However, this approach is disadvantageous with respect to an increased coefficient of friction and staining of the calender rolls.

The present inventors have conducted extensive studies to provide lubricants which eliminate the above described disadvantages. As a result, it has been discovered that a magnetic recording medium excellent in electromagnetic properties and running performance is achieved, and which is efficiently manufactured without staining the calender rolls by incorporating in the magnetic layer containing a ferromagnetic powder at least one fatty acid amide compound and two specific fatty acid esters compounds having differen structural formulae in combination, to thereby achieve the present invention.

SUMMARY OF THE INVENTION

An object of the present invention is to provide a magnetic recording medium having both improved electromagnetic properties and running durability, and which is efficiently manufactured without staining the calender rolls.

A second object of the present invention is to provide a magnetic recording medium which exhibits excellent electromagnetic properties, mainitains excellent running performance in fluctuating temperature and humidity conditions and enables an improvement in the productivity thereof to offer an inexpensive product.

Particularly, an object of the present invention is to provide a magnetic recording medium which exhibits excellent electromagnetic properties such as reproduction output, maintains a low coefficient of friction under conditions of high temperature and humidity, provides excellent running performance, and which is efficiently manufactured without staining the calender rolls even that a ferromagnetic metal powder is incorporated into the magnetic layer.

These and other objects of the present invention are apparent from the following detailed description and Examples.

The objects of the present invention are accomplished by providing a magnetic recording medium comprising a non-magnetic support having provided thereon a magnetic layer comprising a ferromagnetic powder dispersed in a binder, wherein at least one fatty acid amide represented by formula (I), at least one fatty acid ester represented by formula (II) and at least one fatty acid ester represented by formula (III) are provided in or on the magnetic layer:

wherein $R^1$ represents a $C_{13-21}$ straight-chain saturated hydrocarbon group;

wherein $R^2$ represents a $C_{12-21}$ straight-chain or branched saturated or unsaturated hydrocarbon group; and $R^3$ represents a $C_{1-10}$ straight-chain or branched saturated or unsaturated hydrocarbon group;

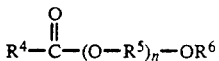

wherein $R^4$ represents a $C_{12-21}$ straight-chain or branched saturated or unsaturated hydrocarbon group; $R^5$ represents a $C_{2-3}$ divalent hydrocarbon group; $R^6$ represents a $C_{1-10}$ straight-chain or branched saturated or unsaturated hydrocarbon group; and n represents an integer 1 to 10 where n may be the same or different when the magnetic layer contains two or more compounds represented by formula (III).

The effects of the present invention are further enhanced by providing in or on the magnetic layer a $C_{12-22}$ fatty acid together with the compounds of the present invention.

DETAILED DESCRIPTIOIN OF THE INVENTION

The magnetic layer in the present magnetic recording medium contains a fatty acid amide represented by formula (I). The fatty acid amide represented by formula (I) may be uniformly contained in the magnetic layer or may be localized particularly at the surface of the magnetic layer. Examples of fatty acid amides represented by formula (I) for use in the present invention include:
$H_3C(CH_2)_{12}CONH_2$
$H_3C(CH_2)_{14}CONH_2$
$H_3C(CH_2)_{16}CONH_2$
$H_3C(CH_2)_{18}CONH_2$
$H_3C(CH_2)_{20}CONH_2$ Particularly effective among the fatty acid amides represented by formula (I) are these wherein $R^1$ is a $C_{13-17}$, more preferably $C_{16-18}$, straight-chain saturated hydrocarbon group.

If the fatty acid used as a starting material to prepare the fatty acid amide is a natural product, the fatty acid usually comprises a mixture of fatty acids containing hydrocarbon groups corresponding to the group $R^1$ having a different number of carbon atoms as opposed to cases where it contains groups corresponding to $R^1$ having the same number of carbon atoms. An fatty acid amide derived from a mixture of fatty acids containing groups corresponding to $R^1$ having a different number of carbon atoms generally provides a superior coefficient of friction than an fatty acid amide constituted by $R^1$ groups having the same number of carbon atoms. Particularly, an enhanced coefficient of friction is attained when two different fatty acid amides, e.g., $H_3C(CH_2)_{16}CONH_2$ and $H_3C(CH_2)_{14}CONH_2$ are used in admixture (e.g., in a weight ratio of from 1:2 to 2:1), as opposed to when one of the two fatty acid amides is used alone.

Preferred examples of ester compounds represented by formula (II) for use in the present inveniton are those wherein $R^2$ is a $C_{12-20}$ straight-chain or branched saturated or unsaturated hydrocarbon group and $R^3$ is a $C_{3-8}$ straight-chain or branched saturated or unsaturated hydrocarbon group, such as butyl stearate, butyl palmitate, isoamyl stearate, isooctyl stearate, and isoheptyl stearate.

Particularly preferred among these ester compounds are those having a relatively small molecular weight, such as isoamyl stearate, butyl stearate and isoheptyl stearate, which compounds remarkably improve the durability of video tape.

Preferred examples of ether-containing ester compounds represented by formula (III) for use in the present invention are those wherein $R^4$ is a $C_{12-20}$ straight-chain or branched saturated hydrocarbon group, $R^6$ is a $C_{2-8}$ straight-chain or branched saturated or unsaturated hydrocarbon group and n is an integer of 1 to 6, particularly preferably 2 to 4, and examples include alkoxy esters of fatty acids such as butoxyethyl stearate, butoxyethyl palmitate, and butoxy-propyl stearate, monohydrocarbyl diethylene glycol esters of fatty acids such as butyl diethylene glycol stearate, butyl diethylene glycol palmitate, and octyl diethylene glycol myristate, and monohydrocarbyl polyalkylene oxide esters of fatty acids such as methyl decaethylene glycol stearate, and butyl heptapropylene glycol laurate. Particularly preferre among these ether-containining ester compounds are butoxyethyl stearate, and those containing two or three alkylene oxides such as butyl diethylene glycol stearate, which compounds remarkably improve the coefficient of friction.

The fatty acid amide and esters represented by formulae (I), (II) and (III) serve as lubricant acid are preferably incorporated into the magnetic layer for simplicity of the manufacturing process. Alternatively, they can be coated on the surface of the magnetic layer in the form of a solution.

The addition amount of the fatty acid amide compound incorporated in the magnetic layer varies with the number of carbon atoms contained therein because the solubility (miscibility) of the amide compound in the binder greatly varies with molecular weight. Furthermore, the fatty acid amide compounds do not exhibit a high adsorptivity to the ferromagentic powder in the same manner as fatty acids, such that narrow control of the content thereof is desirable. For example, the addition amount is preferably 0.03 to 0.46 wt % if behenic acid amide is used, 0.06 to 0.9 wt % if stearic acid amide is used, 0.09 to 1.4 wt % if palmitic acid amide is used, 0.15 to 2.2 wt % if myristic acid amide is used, and 0.24 to 3.8 wt % if lauric acid amide is used. They may be used alone or in combination thereof. The addition amount of each fatty acid amide represented by formula (I) is selected based on the number of carbon atoms therein a given by the equation (1). Preferably, at least one of said fatty acid amide is selected with the range given by equation (2):

$$\log (A) + 3.45 \log (C) < 4.3 \quad (1)$$

$$3.1 \leq \log (A) + 3.45 \log (C) < 4.3 \quad (2)$$

wherein log represents a base 10 logarithm; A represents the addition amount based on the ferromagnetic metal powder in wt %; and C represents the number of carbon atoms per molecule of the fatty acid amide.

At least one fatty acid amide compound of the present invention is preferably incorporated in an amount satisfying the equation (2), while other fatty acid amide components, if any, incorporated into the magnetic layer in combination therewith may be used in a lesser amount as provided by the equation (1). However, satisfying the equation (1) alone suffices for providing the effects of the present invention. The total amount of the fatty acid amides is generally in the range of from 0.01 to 10.0 wt % based on the weight of ferromagnetic metal power.

If the content of the fatty acid amide exceeds the above described range, deposition of amide compounds on the surface of the magnetic recording medium results, thereby increasing the $\mu$ value and resulting in drop out. If the fatty acid amide content falls below the above-described range, the running performance is not sufficiently enhanced.

The content of the fatty acid esters represented by formula (II) is preferably in the range of from 0.05 to 5 wt %, and more preferably from 0.1 to 1.5 wt % based on the weight of ferromagnetic metal powder.

The content of the fatty acid esters represented by formula (III) is preferably in the range of from 0.1 to 5 wt %, and more preferably from 0.3 to 3 wt % for best durability and running performance, based on the weight of ferromagnetic metal powder.

In addition to the amide compounds and ester compounds represented by the above-described formulae, a $C_{12-22}$ fatty acid such as stearic acid, palmitic acid and behenic acid can be used in combination therewith to further improve the electromagnetic properties and running performance of a magnetic recording medium, particularly comprising a ferromagnetic metal powder as magnetic powder. In particular, a $C_{18-22}$ saturated fatty acid used in an amount of 0.1 to 1.0 wt % based on the weight of ferromagnetic metal powder provides excellent electromagnetic properties and durability.

The non-magnetic support for used in the present invention is selected from those commonly used in the art. Examples of useful materials constituting the non-magnetic support include films of various synthetic resins such as polyethylene terephthalate, polyethylene naphthalate, polypropylene, polycarbonate, polyamide, polyamide imide, and polyimide, and metal foils such as aluminum foil and stainless steel foil. The thickness of the non-magnetic support is generally in the range of from 3 to 50 $\mu$m, and preferably from 5 to 30 $\mu$m.

The non-magnetic support may comprise a backing layer provided on the side of the magnetic recording medium opposite the magnetic layer.

The ferromagnetic powder to be used in the present invention is not particularily limited.

The ferromagnetic powder for use in the present invention is not specifically limited in its crystal form, but is generally employed in the form of a needle, particle or the like. The specific surface area of the ferromagnetic powder is preferably in the range of 45 m$^2$/g or more in order to provide good electromagnetic properties. In particular, ferromagnetic metal powders are preferably used.

The examples of ferromagnetic metal powders include those having a metal content of 75 wt % or more and 80 wt % or more of the metal content being at least a kind of ferromagnetic metal or alloy (e.g., Fe, Co, Ni, Fe-Co, Fe-Ni, Co-Ni, Co-Ni-Fe) and alloys having another components in an amount of 20 wt % or less of the metal content (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, Bi). The above ferromagnetic metals may contain a slight amount of water, hydroxides or oxides. The ferromagnetic metal powders preferably have a coercive force of 1,000 Oe or more and a length (long axis) of 0.5 $\mu$m or less.

The method for preparting these ferromagnetic powder is conventional, and ferromagnetic powders used in this invention can be prepared by a conventional method (for example, the method as described in *Chemistry and Industry of Macnetic Substance*, Tekumato K.K.).

The binder constituting the magnetic layer is selected from those commonly used in the art. Examples of binders for use in the present invention include vinyl chloride-vinyl acetate copolymers, copolymers of vinyl chloride and vinyl acetate with vinyl alcohol, maleic acid and/or acrylic acid, vinyl chloride-vinylidene chloride copolymers, vinyl chloride-acrylonitrile copolymers, ethylene-vinyl acetate copolymers, cellulose derivatives such as nitrocellulose resins, acrylic resins, polyvinyl acetal resins, polyvinyl butyral resins, epoxy resins, phenoxy resins, polyurethane resins, and polycarbonate polyurethane resins. In order to further improve dispersibility and durability, the above described binders preferably contain polar groups (e.g., epoxy group, $CO_2H$, $OH$, $NH_2$, $SO_3M$, $OSO_3M$, $PO_3M_2$, $OPO_3M_2$ wherein M, which may be the same or different for each polar group present in a binder molecule, is selected from hydrogen atom, an alkaline metal and ammonium). The content of the polar group is preferably in the range of from $10^{-7}$ to $10^{-3}$ equivalent, more preferably from $10^{-5}$ to $5 \times 10^{-4}$ equivalent per gram of polymer.

The above-described high molecular weight binders may be used singly or in admixture. The high molecular weight binders are often subjected to curing with a known isocyanate crosslinking agent.

The compounds of formulae (I), (II) and (III) of the present invention can be used in a binder system comprising an acrylic ester oligomer and a monomer which is cured by irradiation.

The total binder content in the magnetic layer of the magnetic recording medium of the present invention is generally in the range of from 10 to 100 parts by weight, preferably 20 to 40 parts by weight, based on 100 parts by weight of ferromagnetic powder.

The magnetic layer of the magnetic recording medium of the present invention preferably further contains inorganic particles having a Mohs' hardness of 5 or mcre.

The inorganic particles for use in the present invention is not specifically limited so long as it exhibits a Mohs, hardness of 5 or more, and preferably 8 or more. Examples of inorganic particles include Al$_2$O$_3$ (Mohs' hardness: 9), TiO (Mohs, hardness 6), TiO$_2$ (Mohs' hardness 6.5), SiO$_2$ (Mohs, hardness 7), SnO$_2$ (Mohs' hardness: 6.5), Cr$_2$O$_3$ (Mohs' hardness: 9) and $\Delta$-Fe$_2$O$_3$ (Mohs' hardness 5.5). The inorganic particles can be used singly or in admixture.

If a relatively soft particulate inorganic substance having a Mohs' hardness of less than 5 is used, it tends to separate from the magnetic layer. Furthermore, a soft particulate inorganic substance provides little or no abrasion for the video head and tends to clog the video head and deteriorate running durability.

The content of the particulate inorganic substance is generally in the range of from 0.1 to 20 parts by weight, preferably from 1 to 10 parts by weight, based on 100 parts by weight of ferromagnetic powder.

In addition to the above described particulate inorganic substances, carbon black (particularly having a mean particle diameter of 10 to 300 nm) or the like is preferably incorporated into the recording layer.

A process for the preparation of the magnetic recording medium of the present invention is described in reference to the cas where the fatty acid amides of formula (I) are incorporated into the magnetic coating as opposed to being mainly arranged at the surface of the recording layer.

In particular, a ferromagnetic powder, a binder, the fatty acid amide of formula (I) and the fatty acid esters of formulae (II) and (III), and optionally other fillers and additives are kneaded with a solvent to prepare a magnetic coating solution. The solvent for use in the kneading includes these solvents commonly used for the preparation of a magnetic coating.

The process for the kneading of the materials is not specifically limited. The order of addition of these components is readily as certained by on of ordinary skill in the art.

The preparation of the magnetic coating can be accomplished by means of a two-roll mill, three-roll mill, ball mill, pebble mill, trommel, sand grinder, Szegvari attritor, high speed impeller, dispersing mixer, high speed stone mill, high speed impact mill, dispersing machine, kneader, high speed mixer, homogenizer, ultrasonic dispersing machine or the like.

In the process for the preparation of the magnetic coating, known additives such as dispersant, antistatic agent and lubricants other than these represented by formulae (I), (II) and (III) can be used in combination with the above described additives.

Dispersants for use in preparing the magnetic coating solution include known dispersants such as metallic soaps mades of fatty acid and alkaline metal (e.g., lithium, sodium, potassium, barium), fatty acid esters other than those of formulae (II) and (III), compounds obtained by the substitution of some o all of hydrogen atoms in fatty acid esters by fluorine atoms, fatty acid amides other than those of formula (I), aliphatic amines, higher alcohols, polyalkylene oxide alkyl phosphates, alkyl phosphates, alkyl borates, sarcosinates, alkyl ether esters, trialkyl polyolefins, oxy quaternary ammonium salts and lecithine.

If a dispersant is used, the content thereof is generally in the range of from 0.1 to 10 parts by weight based on 100 parts by weight of ferromagnetic powder.

Examples of antistatic agents for use in the present invention include a finely divided powder of an electrically conductive material such as carbon black and carbon black graft polymer, natural surface active agents such as saponin, nonionic surface active agents; cationic surface active agents such as higher alkylamines, quaternary ammonium salts, pyridine and other heterocyclic compounds, phosphonium, sulfonium; anionic surface active agents containing acidic groups such as carboxylic acid, phosphoric acid and phosphoric ester; and amphoteric surface active agents such as amino acids, aminosulfonic acids, sulfuric or phosphoric esters of amino alcohol. If the above-described finely divided powder of an electrically conductive material is used as an antistatic agent, its content is generally in the range of from 0.1 to 10 parts by weight based on 100 parts by weight of ferromagnetic powder. If a surface active agent is used as an antistatic agent, the content thereof is generally in the range of from 0.12 to 10 parts by weight based on 100 parts by weight of ferromagnetic powder.

Examples of additional lubricant additives for use in the present invenion include known lubricants or plastic lubricants, such as sorbitan oleate, mineral oils, animal oils, vegetable oils, olefin polymers having a low polymerization degree, silcone oils, modified silicone oils, and finely divided powder of graphite, molybdenum disulfide, or tetrafluoroethylene polymer.

The above-described additives such as dispersants, antistatic agents and lubricants are not strictly limited to their stated effects. For example, the above-described lubricants may serve as lubricants as well as antistatic agents. If a substance having a plurality of effects is used, the content thereof is determined by taking into account the plurality of effects.

The magnetic coating thus prepared is then coated on the non-magnetic support. The magnetic coating is coated directly on the non-magnetic support or via an adhesive layer or the like.

In coating of the magnetic layer of the present invention on the non-magnetic support, air doctor coating, blade coating, rod coating, extrusion coating, air knife coating, squeeze coating, dip coating, reverse roll coating, transfer roll coating, gravure coating, kiss coating, cast coating, spray coating, spin coating, etc can be used. Other coating methods can also be employed.

A process for the dispersion of the ferromagnetic powder and binder, and a process for the coating of the magnetic coating on a support of the present invention are further described in reference to JP-A-54-46011 and 54-21805.

The dried thickness of the magnetic layer thus coated is generally in the range of from about 0.5 to 10 μm, and preferably 1.5 to 7.0 μm.

The magnetic layer thus coated on the non-magnetic support, if the magnetic recording medium is used in the form of a tape, is generally subjected to orientation of the ferromagnetic powder in the magnetic layer, i.e., magnetic orientation, before being dried. The magnetic layer thus coated is optionally subjected to smoothening. The magnetic recording medium which has been subjected to smoothening or the like is then cut into pieces having the desired shape.

The magnetic recording medium prepared in accordance with the present invention is a magnetic recording medium which exhbits excellent electromagentic properties and has an extremely excellent running performance. If the present magnetic recording medium is used as a video tape, it exhibits a high reproduction output and provides an excellent running performance under severe conditions of high temperature and humidity. It is considered that the fatty acid amide of the present invention exerts not only a lubricating effect but also an excellent dispersing effect. In regard to the manufacturing process, the present invention is characterized in that little or no stain occurs on the rolls at the surface smoothening process (calendering) after coating. It is considered that the amide compound of the present invention effectively exerts releasing action in the manufacture of the magnetic recording medium.

The present invention is characterized in that an fatty acid amide compound and two fatty acid esters compounds are used in combination. The fatty acid amide compound exhibits excellent properties but is readily separated (deposited) from the magnetic layer. An ester represented by formula (II) exerts an effect of further improving durability, but is poorly compatible with the binder, resulting in an excessive lubricant content at the surface of the magnetic layer. When an ester represented by formula (III) having a ether bond that is compatible with the binder is used in combination with the fatty acid amide compound and the ester compounds of formula (II) in accordance with the present invention, the surface properties of the binder are improved. The ester compound of formula (III) also serves as a solvent to thereby increase the solubility of the fatty acid amide compound, and to decrease the $\mu$ value while inhibiting the deposition of the fatty acid amide compound. However, if the ester represented by formula (III) is used alone, the content thereof in the surface of the magnetic layer is insufficient to impart the desired effect. In order to make up for the insufficincy, an ester represented by formula (II) is added to the system. The ester represented by formula (III) serves not only as a solid lubricant but also as a liquid lubricant when present in excess.

The present invention will be further described in the following nonlimitting Examples and Comparative Examples. In Examples and Comparative Examples, all parts are by weight.

EXAMPLE 1

The follow compositions were subjected to kneading and dispersion in a ball mill over a period of 48 hours. 6 parts by weight of polyisocyanate were added to the mixture. The resulting mixture was then subjected to kneading and dispersion over a period of 1 hours. The material was then filtered through a filter having a mean pore diameter of 1 μm to prepare a magnetic coating solution. The magnetic coating solution was then coated on the surface of a 10 μm-thick polyethylene terephthalate support by means of a reverse roll to a dry thickness of 4.0 μm.

| Composition of Magnetic Coating: | |
|---|---|
| A: Ferromagnetic metal powder (Fe: 94%; Zn: 4%; Ni: 2%; coercive force: 1,500 Oe; specific surface area: 54 m²/g) or | 100 parts |
| B: Cobalt-doped γ-iron oxide (coercive force: 700 Oe; specific surface area: 48 m²/g) (Table 1 indicates use of either A or B) | |
| Vinyl chloride/vinyl acetate/maleic anhydride copolymer ("400X110A", available from Nihon Zeon K.K.; polymerization degree: 400) | 11 parts |
| Polyester polyurethane ("Nipporan 2304", available from Nippon Polyurethane K.K.) | 7 parts |
| Abrasive (α-alumina; mean particle diameter: 0.3 μm) | 5 parts |
| Oleic acid | 0.5 parts |
| Stearic acid | 0.5 parts |
| Other additives | shown in Table 1 |
| Carbon black (mean particle diameter: 40 nm) | 2 parts |
| Methyl ethyl ketone | 300 parts |

The non-magnetic support on which the magnetic coating had been coated was then subjected to magnetic orientation with a 300-gauss magnet while the magnetic coating was wet. The material was then dried, supercalendered, and cut into an 8 mm wide tape to prepare an 8 mm video tape.

The magnetic recording medium specimen was also evaluated for staining during the supercalendering.

A 7-MHz signal was recorded on the video tape thus prepared through a VTR (FUJIX-8, available from Fuji Photo Film Co., Ltd.) and then reproduced. The reproduction output from the video tape was determined relative to that from a reference video tape (Comparative Example 1) as 0 dB.

The video tape was brought into contact with a stainless steel pole with a tension ($T_1$) of 50 g (at a winding angle of 180 °). The tension ($T_2$) was adjusted to allow the video tape to run at a rate of 3.3 cm/sec. The video tape was evaluated under the above conditions. The coefficient of friction of the video tape was determined on the basis of the measurements by the following equation:

$$\mu = 1/\pi \cdot \ln(T_2/T_1)$$

The measurement of the coefficient of friction was effected under two conditions: (a) 20 ° C. and 70 % RH, and (b) 40 ° C. and 80 % RH, the results of which are set forth in Table 1, wherein all addition amounts are given in parts by weight.

TABLE 1

| Specimen No. | 1 | 2 | 3 | 4 | 5 | 6 | 7 | 8 | 9 | 10 | 11 | 12 |
|---|---|---|---|---|---|---|---|---|---|---|---|---|
| (Amides) | | | | | | | | | | | | |
| Behenic acid amide | — | — | — | — | 0.2 | — | — | — | — | — | — | — |
| Stearic acid amide | 0.3 | 1.1 | — | — | — | — | — | — | 0.3 | 0.3 | 0.3 | 0.3 |
| Myristic acid amide | — | — | 2.4 | 0.1 | — | 0.5 | — | — | — | — | — | — |
| Lauric acid amide | — | — | — | — | — | — | 0.2 | — | — | — | — | — |
| ARMID HT*¹ | — | — | — | — | — | — | — | 0.3 | — | — | — | — |
| (Esters) | | | | | | | | | | | | |
| Propyl stearate | — | — | — | — | — | — | — | — | 0.4 | — | — | — |
| Butyl stearate | 0.2 | 0.2 | 0.2 | 0.2 | 0.2 | 0.2 | 0.2 | 0.2 | — | 0.3 | — | — |
| Isoamyl stearate | — | — | — | — | — | — | — | — | — | — | 0.2 | — |
| Isooctyl stearate | — | — | — | — | — | — | — | — | — | — | — | 0.2 |
| Undecyl stearate | — | — | — | — | — | — | — | — | — | — | — | — |
| Butyl decanoate | — | — | — | — | — | — | — | — | — | — | — | — |
| Butyl myristate | — | — | — | — | — | — | — | — | — | — | — | — |
| Butyl behenate | — | — | — | — | — | — | — | — | — | — | — | — |
| Butyl montanate | — | — | — | — | — | — | — | — | — | — | — | — |
| Butyl oleate | — | — | — | — | — | — | — | — | — | — | — | — |
| Butyl eicosanoate*² | — | — | — | — | — | — | — | — | — | — | — | — |

TABLE 1-continued

| | 1 | 2 | 3 | 4 | 5 | 6 | 7 | 8 | 9 | 10 | 11 | 12 |
|---|---|---|---|---|---|---|---|---|---|---|---|---|
| (Ether esters) | | | | | | | | | | | | |
| Butoxyethyl stearate | — | — | — | — | — | — | — | — | — | — | — | — |
| Butoxyethyl decanoate | — | — | — | — | — | — | — | — | — | — | — | — |
| Butoxyethyl montanate | — | — | — | — | — | — | — | — | — | — | — | — |
| Butyl diethylene glycol stearate | 1 | 1 | 1 | 1 | 1 | 1 | 1 | 1 | 1 | 1 | 1 | 1 |
| Ethyl diethylene glycol stearate | — | — | — | — | — | — | — | — | — | — | — | — |
| Butyl dipropylene glycol stearate | — | — | — | — | — | — | — | — | — | — | — | — |
| Isooctyl heptaethylene glycol stearate | — | — | — | — | — | — | — | — | — | — | — | — |
| Reproduction output | 2 | 2 | 2 | 2 | 2 | 2 | 2 | 2 | 2 | 2 | 2 | 2 |
| Friction coefficient (a condition: 20° C. 70 RH %) | 0.2 | 0.2 | 0.2 | 0.23 | 0.21 | 0.2 | 0.28 | 0.21 | 0.2 | 0.2 | 0.22 | 0.2 |
| Friction coefficient (b condition: 40° C. 80 RH %) | 0.2 | 0.24 | 0.23 | 0.22 | 0.2 | 0.2 | 0.30 | 0.21 | 0.2 | 0.21 | 0.23 | 0.21 |
| Stain on calenderroll | None | None | None | None | None | None | None | None | None | None | None | None |

| Specimen No. | 13 | 14 | 15 | 16 | 17 | 18 | 19 | 20 | 21 | 22 | 23 |
|---|---|---|---|---|---|---|---|---|---|---|---|
| (Amides) | | | | | | | | | | | |
| Behenic acid amide | — | — | — | — | — | — | — | — | — | — | — |
| Stearic acid amide | 0.3 | 0.3 | 0.3 | 0.3 | 0.3 | 0.3 | 0.3 | 0.3 | 0.3 | 0.3 | 0.3 |
| Myristic acid amide | — | — | — | — | — | — | — | — | — | — | — |
| Lauric acid amide | — | — | — | — | — | — | — | — | — | — | — |
| ARMID HT[*1] | | | | | | | | | | | |
| (Esters) | | | | | | | | | | | |
| Propyl stearate | — | — | — | — | — | — | — | — | — | — | — |
| Butyl stearate | — | — | — | — | — | — | — | 0.2 | 0.2 | 0.2 | 0.2 |
| Isoamyl stearate | — | — | — | — | — | — | — | — | — | — | — |
| Isooctyl stearate | — | — | — | — | — | — | — | — | — | — | — |
| Undecyl stearate | 0.2 | — | — | — | — | — | — | — | — | — | — |
| Butyl decanoate | — | 0.2 | — | — | — | — | — | — | — | — | — |
| Butyl myristate | — | — | 0.2 | — | — | — | — | — | — | — | — |
| Butyl behenate | — | — | — | 0.2 | — | — | — | — | — | — | — |
| Butyl montanate | — | — | — | — | 0.2 | — | — | — | — | — | — |
| Butyl oleate | — | — | — | — | — | 0.2 | — | — | — | — | — |
| Butyl eicosanoate[*2] | — | — | — | — | — | — | 0.2 | — | — | — | — |
| (Ether esters) | | | | | | | | | | | |
| Butoxyethyl stearate | — | — | — | — | — | — | — | 1 | — | — | — |
| Butoxyethyl decanoate | — | — | — | — | — | — | — | — | 1 | — | — |
| Butoxyethyl montanate | — | — | — | — | — | — | — | — | — | 1 | — |
| Butyl diethylene glycol stearate | 1 | 1 | 1 | 1 | 1 | 1 | 1 | — | — | — | — |
| Butyl diethylene glycol stearate | — | — | — | — | — | — | — | — | — | — | 1 |
| Butyl dipropylene glycol stearate | — | — | — | — | — | — | — | — | — | — | — |
| Isooctyl heptaethylene glycol stearate | — | — | — | — | — | — | — | — | — | — | — |
| Reproduction output | 1 | 1 | 2 | 2 | 1 | 2 | 2 | 2 | 2 | 1 | 2.5 |
| Friction coefficient (a condition: 20° C. 70 RH %) | 0.24 | 0.25 | 0.2 | 0.2 | 0.2 | 0.21 | 0.2 | 0.21 | 0.2 | 0.22 | 0.2 |
| Friction coefficient (b condition: 40° C. 80 RH %) | 0.25 | 0.2 | 0.21 | 0.2 | 0.29 | 0.21 | 0.2 | 0.22 | 0.21 | 0.26 | 0.19 |
| Stain on calenderroll | Observed | Observed | None | None | Observed | None | None | None | None | Observed | None |

| Specimen No. | 24 | 25 | 26 | 27 | 28 |
|---|---|---|---|---|---|
| (Amides) | | | | | |
| Behenic acid amide | — | — | — | — | — |
| Stearic acid amide | 0.3 | 0.3 | 0.3 | 0.3 | 0.3 |
| Myristic acid amide | — | — | — | — | — |
| Lauric acid amide | — | — | — | — | — |
| ARMID HT[*1] | | | | | |
| (Esters) | | | | | |
| Propyl stearate | — | — | — | — | — |
| Butyl stearate | 0.2 | 0.2 | 0.2 | — | 0.2 |
| Isoamyl stearate | — | — | — | — | — |
| Isooctyl stearate | — | — | — | — | — |
| Undecyl stearate | — | — | — | — | — |
| Butyl decanoate | — | — | — | — | — |
| Butyl myristic | — | — | — | — | — |
| Butyl behenate | — | — | — | — | — |
| Butyl montanate | — | — | — | — | — |
| Butyl oleate | — | — | — | — | — |
| Butyl eicosanoate[*2] | — | — | — | — | — |
| (Ether esters) | | | | | |
| Butoxyethyl stearate | — | — | — | — | — |
| Butoxyethyl decanoate | — | — | — | — | — |
| Butoxyethyl montanate | — | — | — | — | — |
| Butyl diethylene glycol | — | — | — | 1 | 1 |

TABLE 1-continued

| | | | | | |
|---|---|---|---|---|---|
| stearate | | | | | |
| Ethyldiethylene glycol stearate | — | — | — | — | — |
| Butyl dipropylene 1 stearate | — | — | — | — | |
| Isooctyl heptaethylene glycol stearate | — | 1 | — | — | — |
| Reproduction output | 2.5 | 2 | 1 | 1 | 1 |
| Friction coefficient (a condition: 20° C. 70 RH %) | 0.2 | 0.21 | 0.29 | 0.25 | 0.36 |
| Friction coefficient (b condition: 40° C. 80 RH %) | 0.2 | 0.21 | 0.32 | 0.27 | 0.4 |
| Stain on calenderroll | None | None | Observed | Observed | Observed |

Note:
*[1] a product of LION AKZO CO., LTD.
*[2] the compound having the following structure

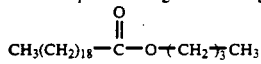

Table 1 shows that Specimen Nos. 1 to 6, 8 to 12, 15 and 16, 18 to 21, and 23 to 25 comprising the fatty acid amide compound and the fatty acid esters compounds of the present invention exhibit a high reproduction output, provide a low coefficient of friction under both conditions (a) and (b), and exhibit an excellent workability particularly when these additives are incorporated in an appropriate amount.

On the other hand, it is also found that comparative specimens which do not contain all of the compounds of formulae (I), (II) and (III) in accordance with the present invention exhibit a low reproduction output, exhibit a larger coefficient of friction under conditions of high temperature and humidity (i.e., condition (b)), and exhibit a poor workability.

While the invention has been described in detail and with reference to specific embodiments thereof, it will be apparent to one skilled in the art that various changes and modifications can be made therein without departing from the spirit and scope thereof.

What is claimed is:

1. A magentic recording medium comprising a non-magnetic support having provided thereon a magnetic layer comprising a ferromagnetic powder dispersed in a binder, wherein at least one fatty acid amide compound represented by formula (I), at least one fatty acid ester represented by formula (II) and at least one fatty acid ester represented by formula (III) are provided in or on the magnetic layer:

wherein $R^1$ represents a $C_{13-21}$ straight-chain saturated hydrocarbon group;

wherein $R^2$ represents a $C_{12-21}$ straight-chain or branched saturated or unsaturated hydrocarbon group; and $R^3$ represents a $C_{1-10}$ straight-chain or brahced saturated or unsaturated hydrocarbon group;

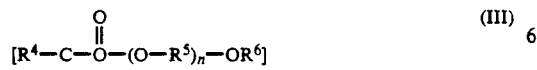

wherein $R^4$ represents a $C_{12-21}$ straight-chain or branched saturated or unsaturated hydrocarbon groupl $R^5$ represents a $C_{2-3}$ divalent hydrocarbon group; $R^6$ represents a $C_{1-10}$ straight-chain or branched saturated or unsaturated hydrocarbon group; and n represents an integer of from 1 to 10 where n may be the same or different when the magentic layer contains two or more compounds representd by formula (III), the addition amount of the at least one amide compound represented by formula (I) is selected within the range given by equation (1):

$$\log (A) + 3.45 \log (C) \leq 4.3 \qquad (1)$$

wherein log represents a base 10 logarithm; A represents the addition amount of the amide compound based on the ferromagnetic powder content in wt %, and C represents the number of carbon atoms per molecule of the amide compound.

2. A magnetic recording medium as in claim 1, wherein the addition amount of at least one amide compound represented by formula (1) is selected within the range given by equation (2):

$$3.1 < \log (a) + 3.45 \log (C) \leq 4.3 \qquad (2)$$

wherein log represents a base 10 logarithm; A represents the addition amount of the amide compound based on the ferromagnetic powder content in wt. %; and C represents the number of carbon atoms per molecule of the amide compound.

3. A magnetic recording medium as in claim 1, wherein the magnetic layer comprises a ferromagnetic powder dispersed in a binder, at least one fatty acids amide compound represented by formula (I), at least one fatty acid ester represented by formula (II), and at least one fatty acid ester represented by formula (III).

4. A magnetic recording medium as in claim 1, wherein the magnetic layer contains at least two fatty acid amide compounds represented by formula (I), each compound of which having a different number of carbon atoms corresponding to the group $R^1$.

5. A magnetic recording medium as in claim 3, wherein the fatty acid amide compound represented by formula (I is contained in an amount of from 0.01 to 10.0 wt % based on the weight of the ferromagnetic powder.

6. A magnetic recording medium as in claim 3, wherein the fatty acid esters represented by formula (II) is contained in an amount of from 0.05 to 5 wt % based on the weight of the ferromagnetic powder.

7. A magnetic recording medium as in claim 3, wherein the fatty acid ester represented by formula (III) is contained in an amount of from 0.1 to 5 wt % based on the weight of the ferromagnetic powder.

8. A magnetic recoridng medium as in claim 3, wherein the magnetic layer further comprises a $C_{12-22}$ fatty acid in an amount of 0.1 to 1.0 wt.% based on the weight of the ferromagnetic powder.

9. A magnetic recording medium as in claim 1, wherein the total binder content in the magnetic layer is in the range of from 10 to 100 parts by weight based on 100 parts by weight of the ferromagnetic powder.

* * * * *